June 13, 1961  A. O. KRESSE ET AL  2,988,431
FUEL DECOMPOSITION CHAMBER
Filed March 3, 1958  2 Sheets-Sheet 1
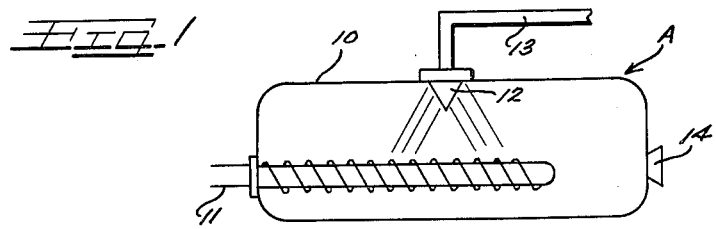
FIG. 1
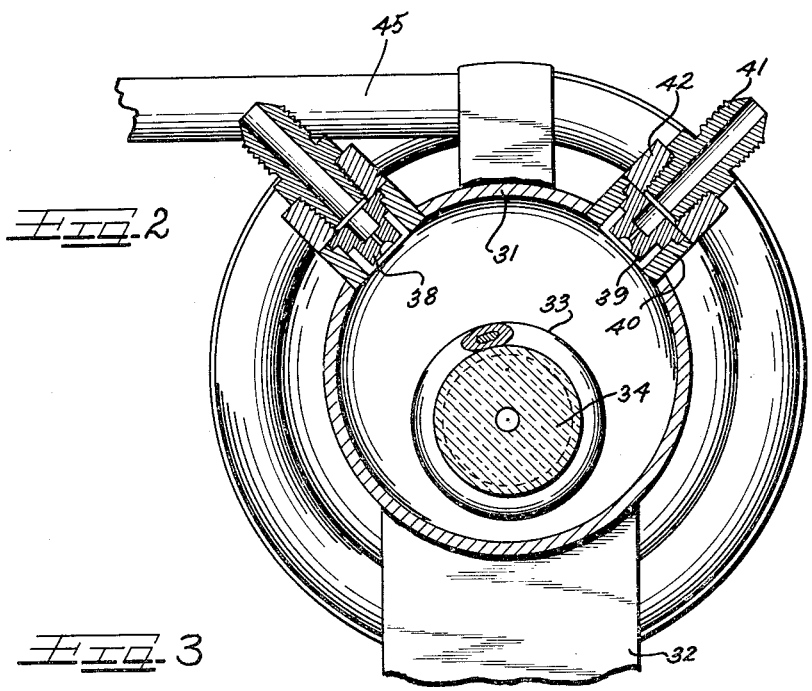
FIG. 2
FIG. 3
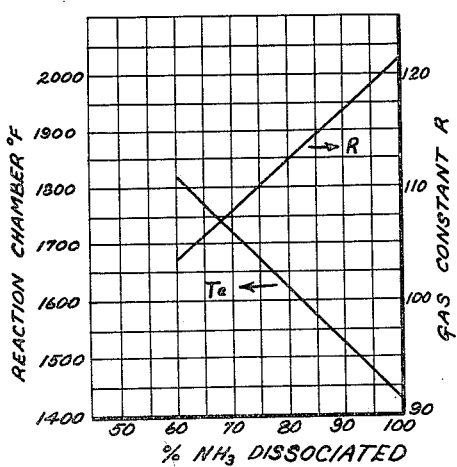
Inventors
ARTHUR O. KRESSE
EDWARD G. RAPP

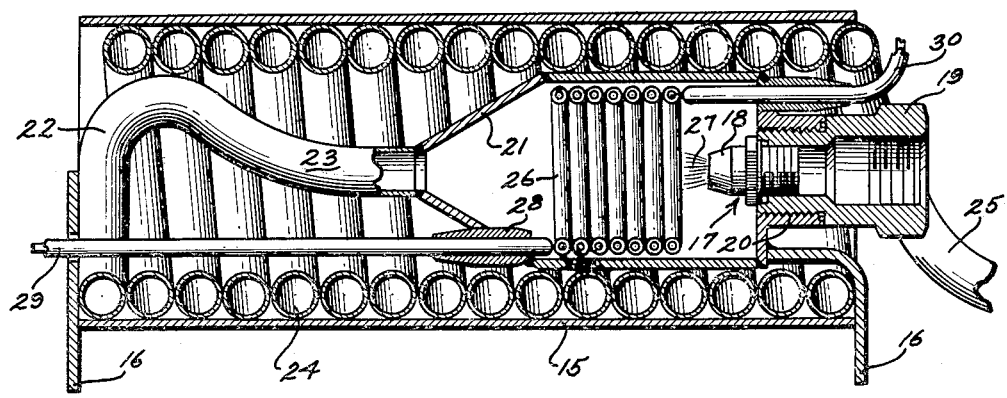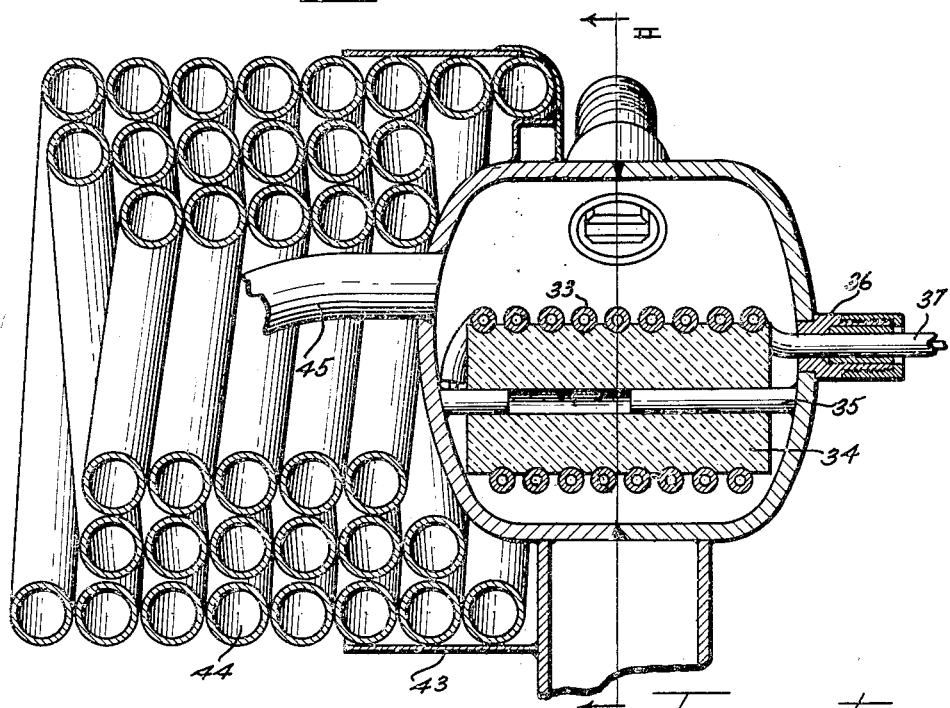

United States Patent Office 2,988,431
Patented June 13, 1961

2,988,431
FUEL DECOMPOSITION CHAMBER
Arthur O. Kresse and Edward G. Rapp, Cleveland, Ohio, assignors to Thompson Ramo Wooldridge Inc., a corporation of Ohio
Filed Mar. 3, 1958, Ser. No. 719,428
8 Claims. (Cl. 23—281)

The present invention relates broadly to the decomposition of high energy fuels, and is more particularly concerned with a new and improved method and means for thermally dissociating hydrazine and like compositions.

It has heretofore been customary in the art to promote the decomposition of hydrazine and the ammonia dissociation product therefrom by gas generating apparatus containing therewithin a suitable catalytic material with which the fuel was caused to make contact. This arrangement, however, is characterized by a number of disadvantages and objections. First, the pellet catalyzers employed for this purpose have variable packing densities, and frequently non-uniform results in the percentage of ammonia decomposed is obtained. Accordingly, the desired degree of temperature reduction of the exhaust gases is not accomplished and a likelihood of damage to engine components arises. Second, the catalytic bed employed is subject to vibration and pressure differentials along its length, both of which conditions are productive of catalyzer break down, and consequent substantial losses in the bed efficiency, and a gradual attrition thereof. Should the bed be impaired to a sufficient degree, experience has shown that frequently the catalytic material will enter the gas flow to the exhaust port and thereafter pass into the turbine, with obvious deleterious results.

These and other known objections to prior art gas generators are essentially entirely avoided by the reaction chamber construction and dissociation method of this invention. The novel structure herein fully disclosed is characterized in part by the complete absence therefrom of catalytic materials, and comprises in general a reaction zone or chamber heated by a glowing member or igniter located in impinging contact with an atomized liquid mixture of hydrazine and like fuels and decomposed thereby into gaseous products which are further dissociated by heat transfer techniques and exhausted through a suitable outlet at the desired temperature. The exothermic heat energies produced by the initial decomposition may be conducted by the chamber structure to promote the dissociation of the gaseous products in contact therewith, or separate heat exchange means in the path of gas flow may be employed.

An important aim of the present invention is to provide an effective thermal decomposition method and means for hydrazine and like fuels which is productive of predictable results in the degree of dissociation effected.

Another object of the invention lies in the provision of gas generating apparatus which is not subject to noticeable breakdown under conditions of vibration and pressure differentials.

Another object of this invention is to provide a reaction chamber for high energy fuels which is of relatively simple construction and extreme reliability, having in addition weight and space requirements substantially less than heretofore employed structures.

Still another object of the invention is to provide a novel method of non-catalytically decomposing hydrazine and like compounds, characterized by first injecting the compound into a reaction zone heated to at least the decomposition temperature of the compound to promote the initial dissociation thereof and the release of substantial exothermic energies, directing the gaseous products along a heat exchange path to induce decomposition of the gaseous products and the absorption of endothermic energies, and exhausting the gaseous products at a reduced temperature non-injurious to component structure.

A further object of the present invention is to provide a new and improved gas generator having a fuel inlet and exhaust gas outlet and a glowing member located therein, the fuel being directed through the inlet into impinging contact with the glowing member to promote dissociation of the fuel into the gaseous products thereof which are then controlled during their passage through the generator toward the exhaust outlet to permit sufficient temperature reduction characteristic of the desired percentage of gaseous product decomposition.

A still further object of this invention lies in the provision of a hydrazine reaction chamber wherein the ammonia product of hydrazine decomposition is passed in heat exchange relation with the interior of the reaction chamber to promote the dissociation of ammonia and accomplish a substantial temperature reduction thereof.

Other objects and advantages of the invention will become more apparent during the course of the following description, particularly when taken in connection with the accompanying drawings.

In the drawings, wherein like numerals are employed to designate like parts throughout the same;

FIGURE 1 is a schematic view of a typical gas generator embodying the principles of this invention;

FIGURE 2 is a vertical cross-section of one form of gas generator utilizing the novel features herein disclosed;

FIGURE 3 is a graph plotting reaction chamber temperature and product gas constant against percentage of ammonia dissociated;

FIGURE 4 is a sectional view of another form of gas generator effective to promote the decomposition therein of hydrazine and like compounds; and FIGURE 5 is a sectional view of the generator of FIGURE 2.

It is known that hydrazine decomposes into ammonia, nitrogen and hydrogen upon reaching a critical temperature and pressure, and releases sufficient thermal energy to heat the gaseous products of decomposition to a temperature greater than approximately 2000° F. The gaseous ammonia product is not stable at this elevated temperature, and rapidly dissociates into nitrogen and hydrogen, absorbing sufficient thermal energy to reduce the temperature of the exhaust gases to about 1900° F. At this point approximately 30% of the ammonia is dissociated.

It is desired in many instances, however, that even further temperature reductions be accomplished in order to prolong the life of the turbine materials. Particularly is this important when it is borne in mind that many existing materials were not originally designed to sustain over long periods the high temperatures currently encountered with high energy fuels.

Reaction chamber temperatures as a function of percentage ammonia dissociation are shown graphically in FIGURE 3. Plotted therein are the results obtained by decomposing two fuel mixtures, one containing by weight approximately 66.7% hydrazine, 21.8% ammonium nitrate and 11.5% water, and the other mixture about 74.0% hydrazine, 14.5% nitric acid and 11.5% water. Substantially identical results were obtained with each mixture, and it may be seen on the graph that the promotion of about 60% ammonia dissociation produces an exhaust gas temperature of approximately 1825° F. Further, exhaust gas temperature reductions in increments of about one hundred degrees are obtained with each ten percent increase in ammonia dissociation from 60% to 100%. In addition, gas constant R increases from about 103 to 121 as the percent of ammonia dissociated increases from around 60% to 100%.

As previously stated, it has heretofore been customary to decompose hydrazine and promote the dissociation of the ammonia product thereof by use of a gas generator provided interiorly with a catalyst bed of suitable composition. Assuming a given flow rate and supply pressure, the parameters which governed the temperature of the exhaust gases emitted was the particular catalytic agent employed and the length of the catalyst bed for a given diameter. However, considerable experience with a generator of this type demonstrated that the catalytic bed was subject to the effects of vibration and substantially pressure differentials along the length thereof, both conditions being productive in many instances of a breakup of the catalyst bed and a consequent gradual attrition and efficiency loss thereof. Further, since the pellet catalyzers employed have variable packing densities, it has often been difficult to predict the results which would be obtained therefrom.

Contrary to the opinions held by others versed in the art, applicants have effectively non-catalytically decomposed hydrazine and other high energy fuel compositions in a gas generator of substantially the structure shown schematically in FIGURE 1 of the drawings, and have thereby avoided the objections long associated with the catalytic type reaction chamber. Referring now to FIGURE 1, it may be seen that the reaction chamber A of this invention comprises essentially a substantially enclosed housing 10 supporting interiorly thereof suitable heating means 11 against which the fuel composition is injected from an inlet nozzle 12 and supply pipe 13, the products of the decomposition reaction within the heated housing thereafter being exhausted through the outlet port 14. Suitable instrumentation devices, such as thermocouples, pressure gauges and like means are of course employed to obtain information with respect to the performance of the reaction chamber.

The reaction chamber A is pressurized during the dissociation of the fuel injected therein, and should be of a construction capable of withstanding pressures in the order of 600 p.s.i. An essential characteristic of the pressure vessel A is effective conductivity of the thermal energy resulting from the combustion of hydrazine, which may be in the order of 148.6 kcal./mol, and accordingly, the vessel is preferably of an essentially metal construction.

Heating coils 11 are shown for purposes of illustration; however, the heater or igniter means may take many forms. Electrical resistant type wire or ribbon heater elements, either of an open construction or encased within an electrically insulated metal housing, may be employed with good results. It is desired that the interior of the housing 10 be heated to a temperature of the order of 700° F. or higher, in order to properly initiate the exothermic reaction, and many heating means of conventional construction will be found effective for this purpose. Further, it may be desired upon occasion to apply heat externally to the pressure vessel walls in order to induce a more rapid reaction of the fuel mixture.

The fuel injector nozzle 12 may take a number of different forms known to the art, and should be capable of delivering into the housing 10 quantities of liquid fuel at a rate of generally not less than about 500 lbs. per hour at pressures of approximately 600 lbs. per square inch. However, under actual operating conditions, the chamber may be utilized effectively at flow rates and pressures varying somewhat from the optimum values indicated. The fuel composition is atomized by the nozzle into the heated housing interior and into impinging contact with the igniter member 11, and it is desired that the maximum quantity of fuel spray make contact with the igniter. For this purpose, the nozzle 12 in the structure of FIGURE 1 is arranged in the reaction chamber top wall, however, other positions of the nozzle have proven well in practice, as will be pointed out in detail later. Further, increased impingement of the fuel on the igniter member may be obtained by the use of additional injector nozzles arranged around the periphery of the reaction chamber A.

The fuel mixture introduced into the chamber 10 is received through the inlet 13 from a supply source which may be fuel tanks pressurized by nitrogen bottles. The mixture may comprise hydrazine as the sole constituent, or in combination with water and either ammonium nitrate or nitric acid in substantially the percentages earlier indicated. While the reaction chamber construction and dissociation method of this invention are presently of prime interest in connection with the dissociation of hydrazine fuels, success has also been had with the same arrangement in the decomposition of normal propyl nitrate fuel which has dissociation properties similar to hydrazine. It will, accordingly, be appreciated that the reaction chamber construction herein disclosed is of important application with high energy fuels other than the compounds specifically mentioned.

The exhaust nozzle 14 may be provided in a number of different forms, and particularly good results have been achieved to date with hot nozzles having areas varying from about 0.01 to 0.04 square inch. Temperature indicating means are of course positioned in close proximity to the nozzle to obtain exhaust gas readings.

A specific form of gas generator embodying the features of this invention is presented in FIGURE 4, and upon reference thereto, it will be seen that there is provided a substantially cylindrical metal housing 15 supported at opposite ends on brackets 16. Received in one end of the housing is an injector assembly 17 comprising an injector nozzle 18 secured to a nozzle adapter 19 threadably engaged by a collar member 20 which is welded or otherwise affixed to the front bracket 16.

Located within the reaction chamber housing 15 is a chamber assembly 21 of generally funnel shape and attached to the neck portion thereof is an exhaust tube 22. The exhaust tube 22 is shaped to include a rearwardly extending portion 23 and a plurality of convolute portions 24 extending from one end to the other of the reaction chamber housing 15 and preferably secured to the inner walls thereof. The exhaust tube 22 may pass outwardly from one end of said housing 15, as indicated by the numeral 25, and to this end of the exhaust tube is connected the exhaust or hot nozzle (not shown). A coiled heater or igniter member 26 is positioned within the chamber assembly 21 in heat exchange relation with the exhaust tube convolutes 24, and is arranged to receive therewithin the fuel spray 27 from the injector nozzle 18. A heater adapter 28 may be employed, and the connecting leads 29 and 30 to the heater 26 may pass outwardly from opposite ends of the housing 15.

It is required for proper starting and smooth operation of the reaction chamber that said chamber have a characteristic length of a value proper for the conditions encountered. Characteristic length is determined by dividing the chamber volume by the exhaust nozzle throat area. The minimum characteristic length at which good operation can be readily obtained varies greatly with generator design, and the factors which must be considered include the type of fuel injector nozzle, shape of the reaction chamber, kind of material used for the internal surfaces thereof, and method of flame front stabilization. The reaction chamber shown in FIGURE 4 has a chamber volume of approximately 25.8 cubic inches and the exhaust nozzle frequently employed therewith has a throat area of approximately 0.033 square inch. The characteristic length of this particular reaction chamber is accordingly 775 inches. This, however, does not represent either its minimum or maximum operational characteristic length, since variations may be made in the factors noted without an undue sacrifice in reaction chamber performance.

A somewhat different form of gas generator employing a pair of injector nozzles which direct the fuel spray radially inwardly to a reaction zone and against a heater member is illustrated in FIGURES 2 and 5. There is provided in this embodiment of the invention a substantially cylindrical metal housing 31 mounted on brackets 32 and carrying interiorly an igniter or heater member 33. The heater 33 may include a support 34 carried by a rod 35 attached to the inner walls of the housing 31. A heater terminal 36 is received in the wall of the burner housing 31, and passing through said terminal is a heater wire 37 convolutely arranged about the support 34, and connected at opposite ends to a suitable electrical source.

A pair of injector nozzles 38 and 39 are employed to accomplish more effective impingement of the fuel spray upon the heater member 33 and into the heated housing 31. The injector nozzles 38 and 39 are preferably carried within adapters 40 supported by the housing circumference, and fittings 41 threaded into adapters 42 provide connections for the fuel lines.

Attached to the mounting brackets 32 for the burner housing 31 and in heat exchange relation with said housing is a casing 43 supporting therein a plurality of stacked convolutions 44 of the exhaust tube 45, which thereupon passes outwardly from the burner housing 31 and is connected to a suitable exhaust nozzle. Particularly effective results in promoting the association of hydrazine and its gaseous ammonia product by heat exchange techniques have been achieved to date by the utilization of three rows of tubing convolutions as shown, and in this arrangement the centers of the innermost row may be placed on a two-inch diameter, while the middle and outermost row may be on three- and four-inch diameters, respectively. As appears in FIGURE 5, the rows of convolutions 44 abut one another, and eighteen convolutions provide a desirable arrangement in effecting optimum decomposition of hydrazine fuels.

The gas generator of FIGURES 2 and 5 has a characteristic length of about 1380 inches, which is substantially greater than the characteristic length of the construction disclosed in FIGURE 4. The chamber volume of the gas generator construction last described is approximately 41.6 cubic inches, and the exhaust nozzle employed in testing of said chamber has a throat area of about 0.033 square inch. The characteristic length figure indicated is derived, as early noted, by dividing the exhaust nozzle throat area into the chamber volume. Proper starting and smooth operation were obtained in all tests with the generator of FIGURES 2 and 5, and variations can of course readily be made in the characteristic length by changes in the factors of fuel injector nozzle, method of flame front stabilization, shape of the reaction chamber, and kind of material used for the internal surfaces thereof. And as will be additionally appreciated, changes in the composition of the fuel mixture may impose requirements upon the reaction chamber which would necessitate design changes thereto.

In each of the arrangements shown, the igniter or heater member is started and the temperature within the reaction chamber raised to about 700° F. or higher. The fuel mixture, which may be hydrazine in combination with ammonium nitrate or nitric acid, normal propyl nitrate, or other high energy fuels of similar characteristics, is then introduced under pressure from a fuel source into the chamber and into impinging contact with the heater member. Decomposition of the hydrazine then takes place within the reaction chamber and there is produced as a result of the reaction ammonia and nitrogen and substantial thermal energy. The exothermic reaction raises the temperature of the gaseous products to approximately 2000° F., and this of course is substantially in excess of the decomposition temperature of ammonia. The ammonia is accordingly disassociated into nitrogen and hydrogen, and the endothermic reaction which then takes place results in the absorption of heat and a reduction in the temperature of the exhaust gases. Provision herein of a reaction chamber having heat conducting inner surfaces, in coil form or otherwise, provides a heat exchange arrangement which maintains the temperature of the ammonia well above its decomposition temperature and accordingly induces further dissociation. It is accordingly now possible to obtain exhaust gas temperatures substantially less than heretofore obtained by conventional structures.

By utilization of the structures herein disclosed, the ammonia product of hydrazine decomposition may be dissociated to a desired percentage and the exhaust gas temperature reduced to a level substantially non-injurious to the turbine components. Accordingly, in order to promote hydrazine dissociation and exhaust gas temperature reductions, it is no longer necessary to tolerate the objections and disadvantages associated with catalytic type gas generators. Variable packing densities common to catalyzers employed in earlier known generators are absent, and it is therefore now possible to predict with a high degree of accuracy the percentage of hydrazine dissociation which will be obtained. In addition, by avoiding the use of catalyzers, there is no likelihood that foreign materials will be drawn through the exhaust port into the turbine from the catalytic bed.

It is to be understood that the forms of the invention herein shown and described are to be taken as preferred emobdiments of the same, and that various changes in the size, shape and arrangement of parts may be effected without departing from the spirit of the invention or the scope of the subjoined claims.

We claim as our invention:

1. A thermal decomposition chamber for high energy monopropellant fuels comprising a housing provided with heat conducting surfaces, heating means supported within said housing in heat transfer relation with the heat conducting surfaces and surrounded thereby, a fuel inlet arranged to direct pressurized fuel in a straight line path into impingement with the heating means to initiate the decomposition of said fuel into a plurality of gaseous products one of which is susceptible to further dissociation and heat absorption upon exposure to exothermic heat energies released by the initial decomposition, the heat conducting surfaces receiving said gaseous products to promote the further dissociation of said one gaseous product and reduce the temperature of the gaseous products resulting, and an exhaust port in communication with the interior of the housing receiving said resulting gaseous products and any volumes of said gaseous product remaining therewith.

2. A gas generator for thermally decomposing high energy monopropellant fuels, comprising a substantially enclosed pressure vessel provided with heat conducting surfaces therein, a heating member located in said vessel in heat-transfer relation with the conducting surfaces, and surrounded thereby, a fuel injector spaced from the heating member and arranged to direct a liquid heat-decomposable monopropellant fuel thereagainst in a straight line path to initiate the dissociation of said fuel into a plurality of gaseous products one of which is susceptible to further dissociation and heat absorption upon exposure to exothermic heat energies released by the initial decomposition, the heat conducting surfaces of the pressure vessel providing a heat transfer area for the gaseous products to induce decomposition of said one gaseous product and a temperature reduction of the gaseous products resulting, and an exhaust outlet communicating with the interior of the pressure vessel and receiving the resulting gaseous products and any volumes of said one gaseous product remaining therewith.

3. A thermal decomposition chamber for hydrazine monopropellant fuel mixtures, comprising a housing, a fuel injector extending into said housing, heating means in the housing spaced from said injector and in impinging relation with the fuel mixture emitted by the injector to initiate the decomposition thereof into a plurality of gaseous products and the release of substantial thermal energies, one of the gaseous products being susceptible to further dissociation and heat absorption upon exposure to said thermal energies released by the initial composition, and exhaust means receiving the gaseous products and surrounding the heating means in heat transfer relation therewith to maintain the temperature of the one gaseous product above its decomposition temperature and promote further dissociation thereof with an absorption of thermal energy and reduction of the temperature of the gaseous products resulting.

4. A thermal decomposition chamber for monopropellant hydrazine fuel mixtures, comprising a shaped housing provided interiorly thereof with a reaction zone, a fuel injector supported by said housing and having a nozzle portion in the reaction zone, heating means in the reaction zone spaced from the injector nozzle portion to directly receive the fuel mixture emitted therefrom and effect the decomposition of the mixture into a plurality of gasous products, one of the gaseous products being susceptible to further dissociation and heat absorption upon exposure to said thermal energies released by the initial decomposition, exhaust means communicating with the reaction zone and receiving the gaseous products therefrom, and heat exchange means surrounding the heating means and connected to the exhaust means and in heat transfer relation with the reaction zone receiving the gaseous products from the exhaust means and maintaining the temperature of said one of the products above its decomposition temperature to promote the further dissociation thereof and reduce the temperature of the gaseous products resulting.

5. A thermal decomposition chamber for monopropellant hydrazine fuel mixtures, comprising a shaped housing provided interiorly thereof with a reaction zone, a fuel injector supported by said housing and having a nozzle portion in the reaction zone, heating means in the reaction zone spaced from the injector nozzle portion to directly receive the fuel mixture emitted therefrom in a straight line path and effect the decomposition of the mixture into a plurality of gaseous products, one of the gaseous products being susceptible to further dissociation and heat absorption upon exposure to said thermal energies released by the initial decomposition, exhaust means communicating with the reaction zone and receiving the gaseous products therefrom, and tubular heat exchange means connected to the exhaust means and surrounding the reaction zone and heating means in heat transfer relation therewith, said heat exchange means providing a heated path for the gaseous products from the reaction zone and maintaining the temperature of said one of the products above its decomposition temperature to effect further dissociation and absorption of thermal energy to reduce the temperature of the gaseous products resulting.

6. A gas generator for thermally dissociating high energy monopropellant fuels, comprising a shaped housing provided interiorly thereof with a reaction zone, a convolutely shaped tubular heat exchanger carried by the inner walls of the housing and arranged circumferentially around the reaction zone in heat transfer relation thereto, an injector nozzle extending into the reaction zone and substantially surrounded by the heat exchanger to direct decomposable monopropellant fuel into said zone, an igniter member of convolute shape in the reaction zone in the path of fuel discharge from the injector nozzle to raise the temperature of the fuel and reaction zone to decomposition temperature with the formation of a plurality of gaseous products, one of the gaseous products being susceptible to further dissociation and heat absorption upon exposure to said thermal energies released by the initial decomposition, and exhaust means communicating with the reaction zone and heat exchanger and receiving the gaseous products and directing said products through the heat exchanger to dissociate said one of the products and reduce the temperature of the gaseous products resulting.

7. A gas generator for thermally dissociating high energy monopropellant fuels, comprising a reaction chamber, a heating member supported within the chamber, a plurality of fuel injectors carried by the chamber in circumferentially spaced relation thereon and having nozzle portions in alignment with the heater member and spaced radially outwardly therefrom to direct decomposable liquid monopropellant fuel against said member to dissociate said fuel into a plurality of gaseous products, one of which is susceptible to further dissociation and heat absorption upon exposure to exothermic heat energies released by the initial decomposition, and a coiled heat exchanger in communication with the reaction chamber and in the heat transfer relation with said chamber to further dissociate said one of the gaseous products exothermically produced in the reaction chamber and endothermically effect a temperature reduction of the gaseous products resulting.

8. A thermal decomposition chamber for high energy monopropellant fuels, comprising a housing defining therewithin first and second reaction zones, heating means in said first zone in heat transfer relation with heat conducting surfaces in said second zone, a fuel inlet arranged to direct fuel into said first zone to decompose said fuel into a plurality of gaseous products one of which is susceptible to further dissociation and heat absorption upon exposure to exothermic heat energies released by the decomposition, the heat conducting surfaces receiving said gaseous products from said first zone being heated thereby and being sufficiently extensive to promote the further dissociation of said one gaseous product and reduce the temperature of said gaseous products, and an exhaust port in communication with the second zone receiving said reduced temperature gaseous products and any volumes of said one gaseous product remaining therewith.

References Cited in the file of this patent

UNITED STATES PATENTS

| Number | Name | Date |
|---|---|---|
| 1,092,903 | Ellis | April 14, 1914 |
| 1,283,823 | Levy | Nov. 5, 1918 |
| 2,367,870 | Joslyn | Jan. 23, 1945 |
| 2,648,317 | Mikulasek | Aug. 11, 1953 |
| 2,703,565 | Lustig | Mar. 8, 1955 |
| 2,751,750 | Welch | June 26, 1956 |
| 2,858,672 | Clark | Nov. 4, 1958 |
| 2,869,321 | Welch et al. | Jan. 20, 1959 |

FOREIGN PATENTS

| Number | Country | Date |
|---|---|---|
| 154,254 | England | Nov. 22, 1920 |